United States Patent [19]

Tesch, Jr.

[11] Patent Number: 4,573,609

[45] Date of Patent: Mar. 4, 1986

[54] SEED PLANTING APPARATUS

[75] Inventor: Sylvester M. Tesch, Jr., Rte. 1, Highway 12 and PF, Prairie du Sac, Wis. 53578

[73] Assignees: Sylvester H. Tesch, Jr.; Marlynn F. Tesch, both of Prairie Du Sac; Harvey J. Rasmussen; Patricia Rasmussen; Harvey E. Rasmussen, all of Lodi, all of Wis.

[21] Appl. No.: 609,271

[22] Filed: May 11, 1984

[51] Int. Cl.[4] .......................................... B65G 59/04
[52] U.S. Cl. ..................................... 221/211; 53/247
[58] Field of Search ...................... 221/211, 1; 47/1.8; 111/1; 53/247

[56] References Cited

U.S. PATENT DOCUMENTS

| | | |
|---|---|---|
| 2,546,838 | 3/1951 | Tasche . |
| 2,704,685 | 3/1955 | Tyler et al. . |
| 3,750,832 | 8/1973 | Ovarnstorm . |
| 3,986,638 | 10/1976 | DeHart . |
| 4,106,414 | 8/1978 | Vastag . |
| 4,117,953 | 10/1978 | DeHart . |
| 4,251,011 | 2/1981 | Hamilton et al. . |

OTHER PUBLICATIONS

Advertisement by Blackmore Transplanter Co., American Vegetable Grower, Jan. 1983, p. 25.
Advertisement by Blackmore Transplanter Co., American Vegetable Grower, Jul. 1981, p. 101.
Advertisement for Hamilton Natural Seeder by Carlin Sales Corporation.
Advertisement for the Vandana Direct Seeder, Florists' Review, Dec. 24, 1981, p. 93.
Advertisement by Growing Systems, Inc., Grower Talks, Oct. 1982, p. 29.
Advertisement for the Hamilton Natural Automatic Seeder, American Vegetable Grower, Nov. 1982, p. 9.
Advertisement by the Old Mill Company, Florists' Review, Dec. 24, 1981, p. 82.

Primary Examiner—Stanley H. Tollberg
Attorney, Agent, or Firm—Isaksen, Lathrop, Esch, Hart & Clark

[57] ABSTRACT

A seed planting apparatus (10) is disclosed having a seed distribution tray (11) with a top plate (17) with perforations (18) therein at the desired spacing of the seeds to be planted. Vacuum draw is provided to a vacuum chamber (25) defined by walls (23, 24) of the tray to hold seeds spread onto the top plate at the position of the perforations (18). The excess seeds not held to the perforations (18) are removed by tilting the tray upwardly, allowing the seeds to be gathered along the upright side walls (19) of the tray and discharged therefrom, with the inverted tray being thereafter supported on a holding pan (12) in an accurately located position over a planting tray or cell flat which is also held in the holding pan (12). When the seed distribution tray (11) is so located, the vacuum to it is cut off and the seeds are allowed to drop down into their desired positions in the planting tray.

19 Claims, 6 Drawing Figures

SEED PLANTING APPARATUS

FIELD OF THE INVENTION

This invention pertains generally to the field of devices which are used to aid in the planting of seeds in seed beds, flats, compartmented trays, or individual pots.

BACKGROUND ART

In nursery operations it is often necessary to distribute individual seeds into a planting area, such as a nursery flat, with the seeds properly spaced from one another so that each will have sufficient space to develop. The proper spacing of the seeds is particularly significant where multicompartmented plug flats or multiple individual pots are seeded. To perform the task of seeding these nursery trays solely by hand is both time consuming and prone to error—e.g., the placement of multiple seeds where a single seed should be located or the omission of a seed from its place.

A variety of machines have been developed to automate the process of depositing seeds into their proper position in an array of a planting tray or flat. Such automated machines must be capable of separating individual seeds from a batch of seeds for further handling with minimal operator assistance, and the separated seeds must then be accurately positioned individually at their proper positions in the array, again, preferably, with minimal operator assistance. Because seeds can be quite small and are irregularly shaped, the task of separating and handling the seeds by machine is often formidable. The available machines that can successfully handle and distribute seeds of such varying size, weight, configuration, and surface characteristics are complex and expensive and require substantial maintenance. Because of the expense of such machines, their use has generally been limited to larger scale nurseries.

SUMMARY OF THE INVENTION

In accordance with the present invention, an apparatus is provided for distributing seeds into proper position in a rectangular array on a flat or seed planting tray in a semi-automated process. The apparatus is especially suited for use in smaller nurseries since it is relatively inexpensive, simple to operate, and uncomplicated in construction, requiring little mechanical expertise on the part of the operator and minimum maintenance. The apparatus is adapted to distribute seeds of varying sizes and characteristics and is lightweight, compact, and easily moved by an operator.

The seed planting apparatus of the invention includes a seed distribution tray having a flat top plate with a rectangular array of perforations therein of a size smaller than the seeds to be planted, and upright side walls surrounding the top plate on all sides. The spacing of the perforations is selected to match the desired spacing of seeds in the planting tray. The seed distribution tray also has walls forming a box defining a sealed chamber beneath the top plate such that vacuum draw can be applied to a fitting communicating with the chamber by any convenient source of vacuum—for example, a common portable vacuum cleaner.

To use the apparatus, the operator turns on the vacuum and spreads seeds over the top plate such that a single seed clings to each of the perforations which have a vacuum draw applied thereto. The operator then tilts the seed distribution tray upwardly so that the excess seeds collect on the upright side walls toward one corner, from which the operator discharges the excess seeds to a receptacle. The operator then inverts the seed distribution tray over a planting tray which has previously been inserted into a holding pan forming a portion of the apparatus of the invention. The inverted seed distribution tray mates with flanges at the top edges of the holding pan to accurately locate the seed distribution tray laterally, and the tray is pushed against a locator wall or brace which spans the flanges on the holding tray, thereby precisely locating the seed distribution tray and the seeds held thereon over their desired positions on the planting tray beneath. The vacuum is then released, preferably by closing a valve on the seed distribution tray to cut off the chamber from the vacuum source and by opening a vacuum flow relief valve. The seed distribution tray is then removed from the holding pan and the seeded planting tray is thereafter removed by the operator and replaced by a new planting tray to allow the process to be repeated.

The utilization of the apparatus in the manner described above greatly increases the efficiency of planting and reduces the proportion of error from that which would be encountered if the operator were planting the trays without assistance. It is ideally suited to smaller scale nursery operations where complicated and expensive machines which fully automate the planting process are not justifiable.

Further objects, features and advantages of the invention will be apparent from the following detailed description when taken in conjunction with the accompanying drawings illustrating a preferred embodiment of the invention.

BEST MODE FOR CARRYING OUT THE INVENTION

Figure 1:
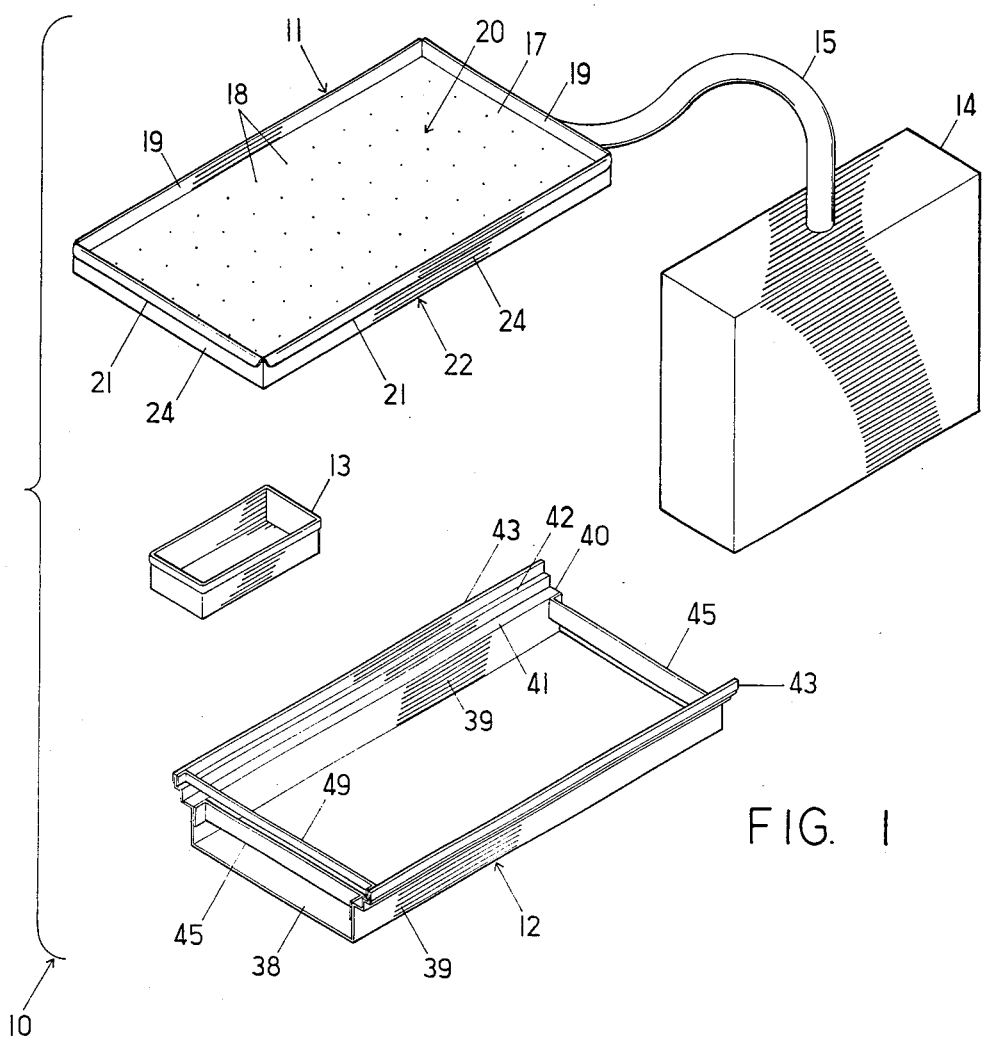
FIG. 1 is an illustrative perspective view of the apparatus of the invention shown with a vacuum source.
Figure 2:
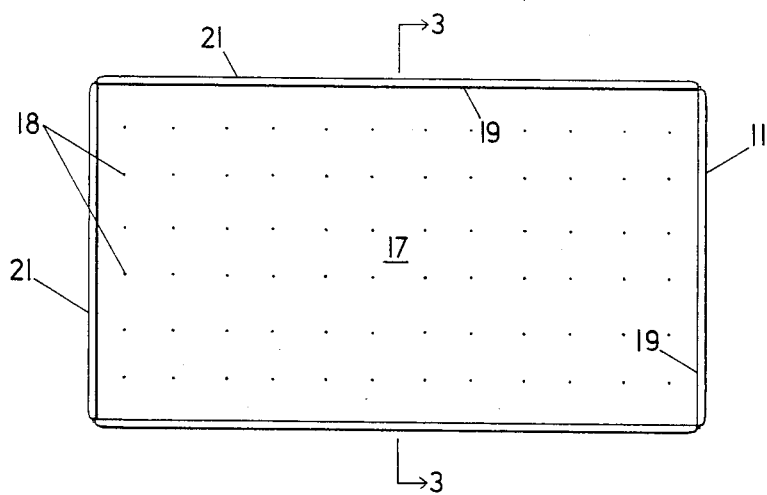
FIG. 2 is a top view of the seed distribution tray portion of the apparatus of FIG. 1.

With reference to the drawings, the components of the seed planting apparatus of the invention are generally denoted at 10 within the brackets in FIG. 1. The apparatus includes a seed distribution tray 11 and a holding pan 12 which, as explained further below, is adapted to hold and locate the seed distribution tray with respect to a planting tray, cell flat, or a rack of small individual pots. For simplicity, a "planting tray" will be referred to herein, although it is understood that the term will refer to any form of receptacle into which seeds may be distributed. An excess seed receptacle 13 may be provided into which the excess seeds from the tray 11 can be collected. The apparatus utilizes a source of vacuum, for example, a common portable vacuum cleaner as illustrated at 14, which is connected to the distribution tray by a hose 15.

Figure 3:
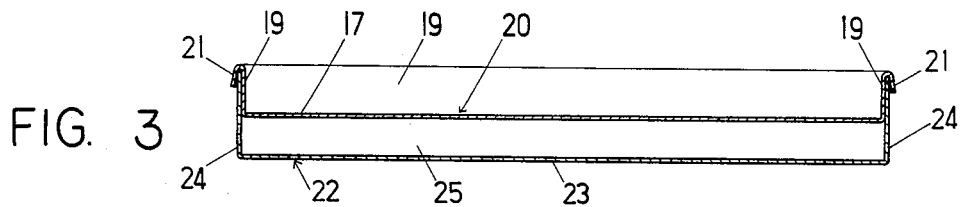
FIG. 3 is a cross-sectional view of the seed distribution tray taken along the lines 3—3 of FIG. 2.

The seed distribution tray has a flat top plate 17 with an array of perforations 18 therein which are preferably regularly spaced from one another in a rectangular array and located at the desired spacing of seeds to be planted in the planting tray. The top plate 17 is surrounded on all sides by upright side walls 19 which are preferably formed integrally with the top plate. The seed distribution tray is preferably formed in two parts, having a top pan portion 20 defined by the top plate 17, the upright walls 19, and downwardly extending flanges 21 formed integrally with the side wall, as best shown in FIG. 3. A bottom pan portion 22 of the seed distribution tray has a flat bottom wall 23, shown in FIG. 3, and four upright side walls 24. The overturned flanges 21 form, with the upright side walls 19 of the top pan, a pocket into which the upright side walls 24 of the bottom pan will fit tightly to form a substantially airtight seal. The top plate 17 and the bottom wall 23 and side walls 24 of the bottom pan define a sealed vacuum chamber 25 beneath the top plate.

Figure 4:
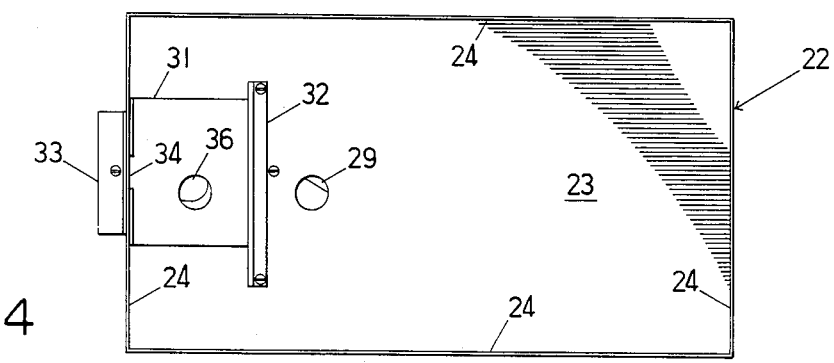
FIG. 4 is a top view of the bottom pan portion of the seed distribution tray.
Figure 5:
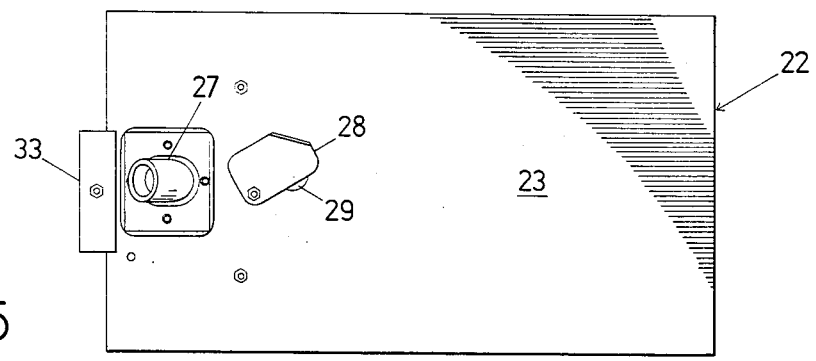
FIG. 5 is a bottom view of the bottom pan.

As best shown in the views of the bottom pan 22 in FIGS. 4 and 5, a vacuum intake fitting 27, preferably formed of resilient rubber or plastic and having a bore in communication with the vacuum chamber 25, is mounted to the bottom wall 23 and is adapted to be connected to the vacuum hose 15 to provide communication therewith to the chamber 25. A plate 28 is pivotally mounted to the bottom wall 23 in position to be turned by the operator to either open or close an opening 29 in the bottom wall to selectively vent the chamber 25 to the atmosphere. The vacuum draw supplied to the chamber 25 is also controllable by a plate valve 31 slidably mounted under a flange 32 attached to the bottom wall and movable back and forth by a handle 33 which is attached to an extension 34 of the plate 31 which passes through a slot in one of the side walls 24. The operator can use the handle 33 to move the plate 31 from side to side, thereby bringing an opening 36 in the plate 31 into and out of alignment with the bore of the fitting 27. For example, when the full vacuum draw is to be applied to the chamber 25, the operator can move the plate 31 to the side to cause the opening 36 to fully align with the bore of the fitting. When the vacuum draw on the chamber 25 is to be cut off, the operator can move the handle 33 in the opposite direction to bring the opening 36 partially or fully out of alignment with the bore of the fitting, thereby cutting off the chamber 25 from the vacuum draw and consequently cutting off the vacuum draw to the perforations 18. By opening the pivoting plate valve 28, the operator can fully vent the chamber 25 to ensure that both sides of the top plate 17 are at atmospheric pressure.

Because the top pan 20 can be detached from the bottom pan 22, it is possible for the operator to substitute a different top pan having perforations of a different size or spacing when necessary to accommodate seeds of different sizes or to provide for a different spacing of the seeds to be deposited in the planting tray. In this manner, a nurseryman can be equipped to handle many different types of seeds with a relatively small investment in an inventory of top pans adapted to the particular seeds.

Figure 6:
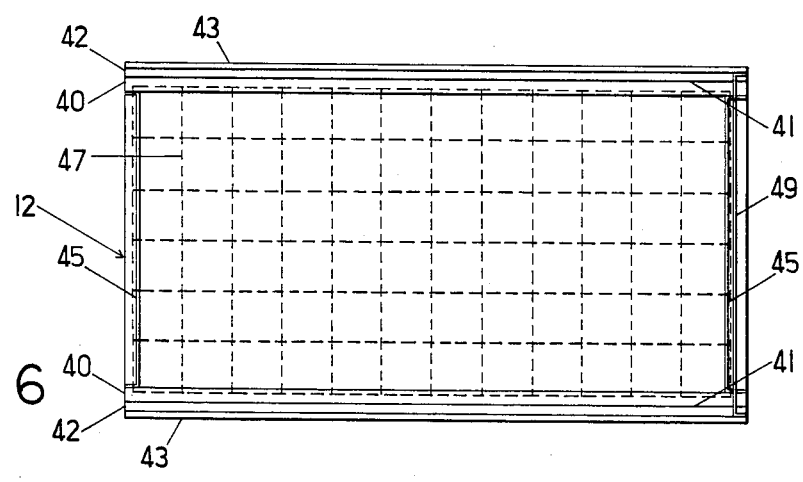
FIG. 6 is a top view of the holding pan portion of the apparatus of FIG. 1, showing the position of a planting tray or flat in dashed lines for illustration.

The holding pan 12 is used to align the planting trays with the seed distribution tray so that the seeds will be deposited at their desired locations. As shown in FIG. 1, the holding pan 12 preferably has a bottom wall 38 and upright enclosure side walls 39 on the two opposite long sides. At the top of each of the side walls 39 is a first outwardly extending flange 40, a first upright wall 41 extending from the flange, a second outwardly extending flange 42, and a second upright wall 43 extending from the flange 42. A planting tray locator enclosure wall 45 is attached between the side walls 39 at each end thereof. The side walls 39 and the locator walls 45 define a box-like structure into which a planting tray of standard dimensions can fit. For illustrative purposes, the outer periphery of the flanges and the top ridges defining cells in a planting tray are shown in dashed lines labeled 47 in FIG. 6, illustrating the position of the planting tray when mounted in the holding pan 12. The first flange 40 serves to engage and support the outwardly extending flanges commonly found on cell flats or planting trays. The second flanges 42 are adapted to engage the top edges of the upright side walls 19 of the seed distribution tray to support the same in inverted position above the planting tray 47. The outer side walls 43 restrain the seed distribution tray so placed against lateral movement and thereby locate it laterally, and a top locator brace 49 mounted between the outer upright walls 43 at one end thereof serves to locate the seed distribution tray longitudinally as the tray is pushed against the brace 49.

To utilize the apparatus 10 to distribute seeds, the operator first places the planting tray into the holding pan 12 to locate it between the enclosure walls 39 and 45. Generally, the planting trays used will have relatively standard dimensions for which the holding pan 12 is sized. As is apparent, holding pans of different sizes may be utilized to conform to the dimensions of particular planting trays. After placement of the planting tray in the holding pan, the operator turns on the vacuum source so that vacuum draw is supplied to the chamber 25 and on the perforations 18. With the seed distribution tray in a substantially horizontal position, the operator then spreads seeds onto the surface of the top plate 17 and manipulates the seed distribution tray until all of the perforations 18 are covered by and hold a seed. As noted above, the perforations are selected to be smaller than the size of the seeds to be distributed so that no seeds pass through the perforations and only one seed is held at each perforation. When the operator has so distributed the seeds, he may then tilt the seed tray 11 to a more or less vertical position, allowing the excess seeds which are not held in the perforations 18 to flow along the side walls 19 until reaching one of the corners, whereupon the operator may discharge the excess seeds into the receptacle 13. With the vacuum still on, the operator then inverts the seed tray 11 and inserts it into the holding pan 12 such that the tray 11 is supported with the top edges of two of the walls 19 resting on the outer flanges 42 and with one of the flanges 21 up tight against the top locator brace 49, thereby positively locating the seed distribution tray on the holding pan with respect to the planting tray beneath it. The vacuum draw supplied to the chamber 25 is sufficient to hold the seeds at the perforations 18 while the tray 11 is being inverted and positioned.

When the positioning is complete, the operator may cut off the vacuum to the seed distribution tray by using the handle 33 to shift the position of the slide plate 31, cutting off the vacuum draw. By also opening the plate valve 28 to uncover the opening 25, the chamber 25 is vented to the atmosphere and the seeds are fully released to fall downwardly into their proper positions in the planting tray. The operator thereafter removes the seed distribution tray and restores it to its original position with the top plate facing upwardly and removes the seeded planting tray and replaces it with another unseeded tray to begin the planting operation anew.

By utilizing the apparatus of the invention in the foregoing manner, substantially less time is occupied by the operator in performing the planting process than would be occupied if the operator were required to individually handle the seeds and deposit them one at a time onto the planting tray. Moreover, since the positions of the seeds are precisely defined when using the apparatus, the spacing of the seeds in the planting tray is much more accurate than can ordinarily be obtained by an individual depositing seeds without a planting aid.

The apparatus 10 is preferably formed of a noncorrosive metal, such as aluminum, which additionally provides for a strong, rugged structure which is light weight and readily carried by the operator. No complex electrical controls or moving parts are required in the utilization of this apparatus, and special sources of vacuum draw or elaborate control mechanisms for the vacuum draw are not required, nor is any source of air under pressure required. As noted above, the source of vacuum draw may constitute a simple, inexpensive portable vacuum cleaner.

It is understood that the invention is not confined to the particular construction and arrangement of parts herein illustrated and described but embraces such modified forms thereof as come within the scope of the following claims.

What is claimed is:

1. Seed planting apparatus for aiding an operator in depositing seeds in selected spacing in a planting tray, comprising:
   (a) a seed distribution tray having a flat top plate with an array of perforations formed therein at the desired spacing of the seeds to be planted, upright side walls extending upwardly from and surrounding the top plate, a bottom wall and side walls defining with the top plate a vacuum chamber, and a fitting on the distribution tray having a bore in communication with the vacuum chamber and adapted for connection to a source of vacuum to thereby place the vacuum chamber under vacuum draw; and
   (b) a holding pan having a bottom wall and upright enclosure walls adapted to locate the planting tray laterally and support means on the enclosure walls for supporting the seed distribution tray in inverted position above a planting tray located between the enclosure walls and accurately locating the inverted seed distribution tray with respect to the planting tray so held.

2. The apparatus of claim 1 wherein the holding pan has two upright side enclosure walls on opposite sides of the bottom wall and wherein the support means includes outwardly extending flanges at the tops of the side enclosure walls adapted to support the inverted seed distribution tray, upright walls at the outer edges of the support flanges to prevent lateral movement of the inverted seed distribution tray and a locator brace extending between the two support flanges in position to engage the seed distribution tray and thereby locate the tray longitudinally with respect to the planting tray beneath it.

3. The apparatus of claim 1 wherein the enclosure walls of the holding pan include two upright side walls on opposite sides of the bottom wall and locator enclosure walls mounted to the side walls and extending between them, such that the side walls and the locator braces define an enclosure for the planting tray which locates it both laterally and longitudinally.

4. The apparatus of claim 1 wherein the flat top plate and the upright side walls extending from the top plate are formed integrally to define a top pan portion of the seed distribution tray and wherein the upright side walls have overturned flanges extending downwardly from the top edges thereof to define a pocket between the overturned flanges and the outer sides of the side walls, and wherein the bottom wall and side walls extending integrally therefrom define a bottom pan and wherein the side walls of the bottom pan are adapted to fit into the pocket between the overturned flanges and the side walls of the top pan to form a substantially airtight seal when so engaged, thereby allowing the top pan to be detached from the bottom pan when desired.

5. The apparatus of claim 1 wherein the seed distribution tray has valve means operated by a handle thereon for opening or closing off the source of vacuum draw applied to the fitting by movement of the handle by the operator.

6. The apparatus of claim 5 wherein the valve means includes a flat plate having an opening therein adapted to slide along the surface of the interior side of the bottom wall to bring the opening therein selectively into and out of alignment with the bore of the fitting, and wherein the sliding plate is attached to a handle which extends outwardly from the seed distribution tray in position to be held by the operator.

7. The apparatus of claim 5 including a slide plate valve operable by the operator to selectively either open or close an opening in the bottom wall of the seed distribution tray thereby either to vent the vacuum chamber to the atmosphere or to close it off from the atmosphere.

8. The apparatus of claim 1 including means for applying a vacuum drawing to the fitting on the seed distribution tray.

9. Seed planting apparatus for use as an aid in depositing seeds in selected spacing in a planting tray, comprising:
   (a) a seed distribution tray having a flat top plate with an array of perforations formed therein at the desired spacing of the seeds to be planted, upright side walls extending upwardly from and surrounding the top plate, a bottom wall and side walls defining with the top plate an enclosed vacuum chamber, and a fitting on the distribution tray having a bore therein in communication with the vacuum chamber and adapted for connection to a source of vacuum to place the vacuum chamber under vacuum draw; and
   (b) a holding pan having a bottom wall and two upright side enclosure walls adapted to hold a planting tray laterally therebetween, first flanges extending outwardly from the tops of the side enclosure walls and adapted to engage and support the flanges that extend outwardly from the tops of a planting tray, locator enclosure walls extending between the side enclosure walls at the ends thereof to hold the planting tray in longitudinal position therein, upright walls extending upwardly from the first flanges, second flanges extending outwardly from the first flanges and adapted to support the top edges of the inverted seed distribution tray, and second upright walls extending upwardly from the second flanges to restrain lateral movement of the seed distribution tray supported in inverse position on the second flanges, and a locator brace extending between the second flanges at the ends thereof to which the seed distribution tray can be engaged to accurately locate the seed distribution tray with respect to a planting tray held in the holding pan beneath.

10. The apparatus of claim 9 wherein the flat top plate and the upright side walls extending from the top plate are formed integrally to define a top pan portion of the seed distribution tray and wherein the upright side walls have overturned flanges extending downwardly from the top edges thereof to define a pocket between the overturned flanges and the outer sides of the side walls, and wherein the bottom wall and side walls extending integrally therefrom define a bottom pan and wherein the side walls of the bottom pan are adapted to fit into the pocket between the overturned flanges and the side walls of the top pan to form a substantially airtight seal when so engaged, thereby allowing the top pan to be detached from the bottom pan when desired.

11. The apparatus of claim 9 wherein the seed distribution tray has valve means operated by a handle thereon for opening or closing off the source of vacuum draw applied to the fitting by movement of the handle by the operator.

12. The apparatus of claim 11 wherein the valve means includes a flat plate having an opening therein adapted to slide along the surface of the interior side of the bottom wall to bring the opening therein selectively into and out of alignment with the bore of the fitting, and wherein the sliding plate is attached to a handle which extends outwardly from the seed distribution tray in position to be held by the operator.

13. The apparatus of claim 11 including a slide plate valve operable by the operator to selectively either open or close an opening in the bottom wall of the seed distribution tray thereby either to vent the vacuum chamber to the atmosphere or to close it off from the atmosphere.

14. The apparatus of claim 9 including means for providing a vacuum draw to the fitting on the seed distribution tray.

15. A seed distribution tray for aiding an operator in depositing seeds in selected spacing in a planting tray, comprising:
a top pan portion having a flat top plate with an array of perforations formed therein at the desired spacing of the seeds to be planted, and upright side walls integrally formed with and extending upwardly from and surrounding the top plate, and a bottom pan portion having a bottom wall and upright side walls adapted to define with the top plate a vacuum chamber and a fitting on the bottom pan portion having a bore in communication with the vacuum chamber so defined and adapted for connection to a source of vacuum thereby to place the vacuum chamber under vacuum draw, and wherein the side walls of the bottom pan fit tightly to the side walls of the top pan to form a substantially airtight seal when so engaged, thereby allowing the top pan to be detached from the bottom pan when desired.

16. The seed distribution tray of claim 15 wherein the top pan portion includes overturned flanges extending downwardly from the upright side walls to define pockets between the overturned flanges and the outer sides of the side walls, and wherein the side walls of the bottom pan fit into the pockets between the overturned flanges and the side walls of the top pan.

17. The seed distribution tray of claim 15 wherein the seed distribution tray has valve means operated by a handle thereon for opening or closing off the source of vacuum draw applied to the fitting by movement of the handle by the operator.

18. The seed distribution tray of claim 17 wherein the valve means includes a flat plate having an opening therein adapted to slide along the surface of the interior side of the bottom wall of the bottom pan to bring the opening therein selectively into and out of alignment with the bore of the fitting, and wherein the sliding plate is attached to a handle which extends outwardly from the seed distribution tray in position to be held by the operator.

19. The seed distribution tray of claim 17 including a slide plate valve operable by the operator to selectively either open or close an opening in the bottom wall of the bottom pan portion thereby either to vent the vacuum chamber to the atmosphere or to close it off from the atmosphere.

* * * * *